Nov. 27, 1962 C. C. BOOKOUT ETAL 3,065,813
AUTOMATIC SPEED CONTROL SYSTEM FOR AN AUTOMOTIVE VEHICLE
Filed July 13, 1960 4 Sheets-Sheet 1

CHARLES C. BOOKOUT
PAUL E. TAYLOR
INVENTORS

BY John R. Faulkner
Keith L. Zerschling
ATTORNEYS

CHARLES C. BOOKOUT
PAUL E. TAYLOR
INVENTORS

Nov. 27, 1962  C. C. BOOKOUT ETAL  3,065,813
AUTOMATIC SPEED CONTROL SYSTEM FOR AN AUTOMOTIVE VEHICLE
Filed July 13, 1960  4 Sheets-Sheet 3

CHARLES C. BOOKOUT
PAUL E. TAYLOR
INVENTORS

BY John B. Faulkner
Keith L. Zerschling
ATTORNEYS

CHARLES C. BOOKOUT
PAUL E. TAYLOR
INVENTORS

BY John R. Faulkner
Keith L. Zerschling

ATTORNEYS

United States Patent Office 3,065,813
Patented Nov. 27, 1962

3,065,813
AUTOMATIC SPEED CONTROL SYSTEM FOR AN AUTOMOTIVE VEHICLE
Charles C. Bookout and Paul E. Taylor, Livonia, Mich., assignors to Ford Motor Company, Dearborn, Mich., a corporation of Delaware
Filed July 13, 1960, Ser. No. 42,525
11 Claims. (Cl. 180—82.1)

This invention relates to a speed control mechanism for an automotive vehicle and more particularly to a speed control mechanism for an automotive vehicle that acts as a speed reminder by exerting a back pressure on an accelerator linkage mechanism at a selected speed and that is capable of automatically maintaining a selected vehicle speed over all reasonable terrain.

The invention includes a linear hydraulic motor having a piston positioned in a housing. Fluid under pressure is supplied to the linear hydraulic motor through a servo control valve that is positioned by the speed of the motor vehicle and by a selected speed set by the motor vehicle operator. The piston includes a pair of chambers each containing a piston having an extension positioned thereon. Fluid under pressure is supplied to the face of one of these pistons remote from the accelerator linkage so that the piston is forced to the end of its chamber remote from the accelerator linkage and, therefore, moves with the main piston of the linear hydraulic motor. The extension on this piston is positioned to exert a back pressure upon the accelerator linkage when the linkage is positioned to propel the motor vehicle at the speed set on the selector dial. This provides a speed reminder for the operator of the motor vehicle, however, the operator can overpower this back pressure by sufficient force on the accelerator linkage so that the vehicle may be driven at a speed over the selected speed.

The invention also includes means to enable the motor vehicle operator to automatically control the speed of the motor vehicle over all reasonable terrain. As stated previously, the main piston of the linear hydraulic motor includes two chambers each having a piston positioned therein. The operation of one of these pistons was discussed in the previous paragraph. The second of these pistons is spring urged toward the end of its chamber remote from the accelerator linkage and the extension thereon is positioned on the other side of the linkage from the extension of the first piston. When the motor vehicle reaches the selected speed the operator may energize an electrical circuit that actuates a solenoid operated spool valve. The actuation of the spool valve admits fluid under pressure to the face of the second piston remote from the accelerator linkage and this moves this piston to the end of its chamber adjacent the linkage and against the force of the spring. This action clamps the accelerator linkage between the extensions of the first and second piston and the accelerator linkage moves with the main piston of the linear hydraulic motor.

In the event the speed of the vehicle falls below the selected speed, as may occur when the vehicle moves up an incline, the control valve supplies additional oil under pressure to the piston of the linear hydraulic motor thus moving the accelerator linkage to supply the motor vehicle engine with a greater amount of fuel. In the event the speed of the vehicle increases to a point in excess of the selected speed, as may occur when the vehicle is moving down an incline, the control valve will be positioned to permit fluid to drain from the linear hydraulic motor, thus moving the accelerator linkage to reduce the fuel supplied to the motor vehicle engine.

The electrical circuit employed to energize the solenoid operated valve also includes means which will prevent the solenoid operated valve from being energized and hence will prevent operation of the automatic speed control feature of the invention at speeds below a selected level, for example, 30 miles per hour and at speeds above a selected level, for example, 85 miles per hour. Means are also provided to deenergize the solenoid of the solenoid actuated spool valve whenever this is desired by the motor vehicle operator, for example, the circuit for energizing the solenoid may include a switch that is opened upon the depression of the brake pedal.

An object of the invention is the provision of a speed control mechanism for an automotive vehicle.

Another object of the invention is the provision of a speed control mechanism for an automotive vehicle that operates as a speed reminder for the operator of the motor vehicle.

A further object of the invention is the provision of a speed control mechanism for an automotive vehicle that is capable of automatically maintaining a selected speed for an automotive vehicle over all reasonable terrain.

Other objects and attendant advantages of the present invention will become more readily apparent as the specification is considered in connection with the attached drawings in which.

Figure 1:
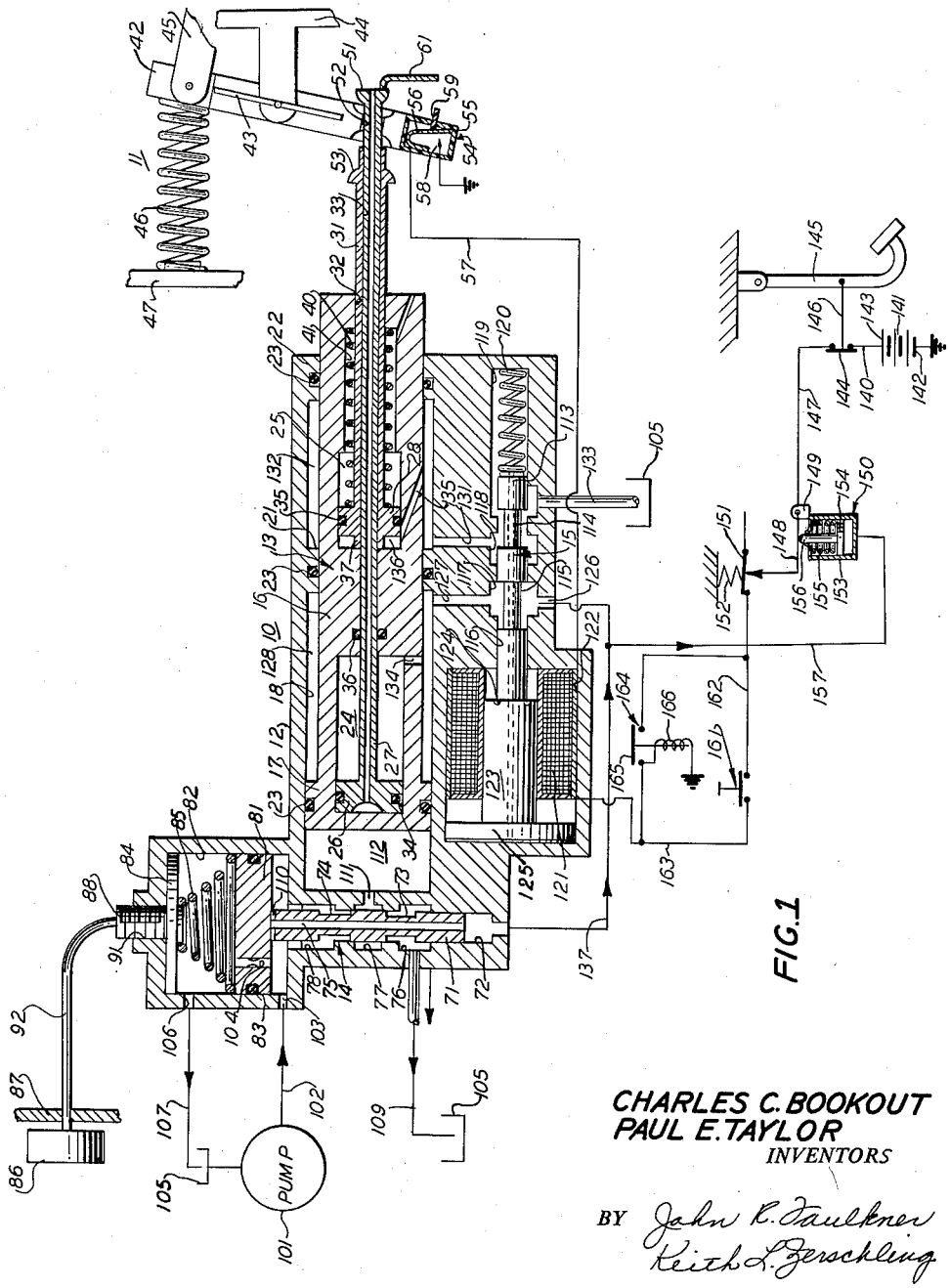
FIG. 1 is a combined sectional and schematic view of one embodiment of the invention showing the automatic speed control feature of the invention in the deenergized position.
Figure 2:
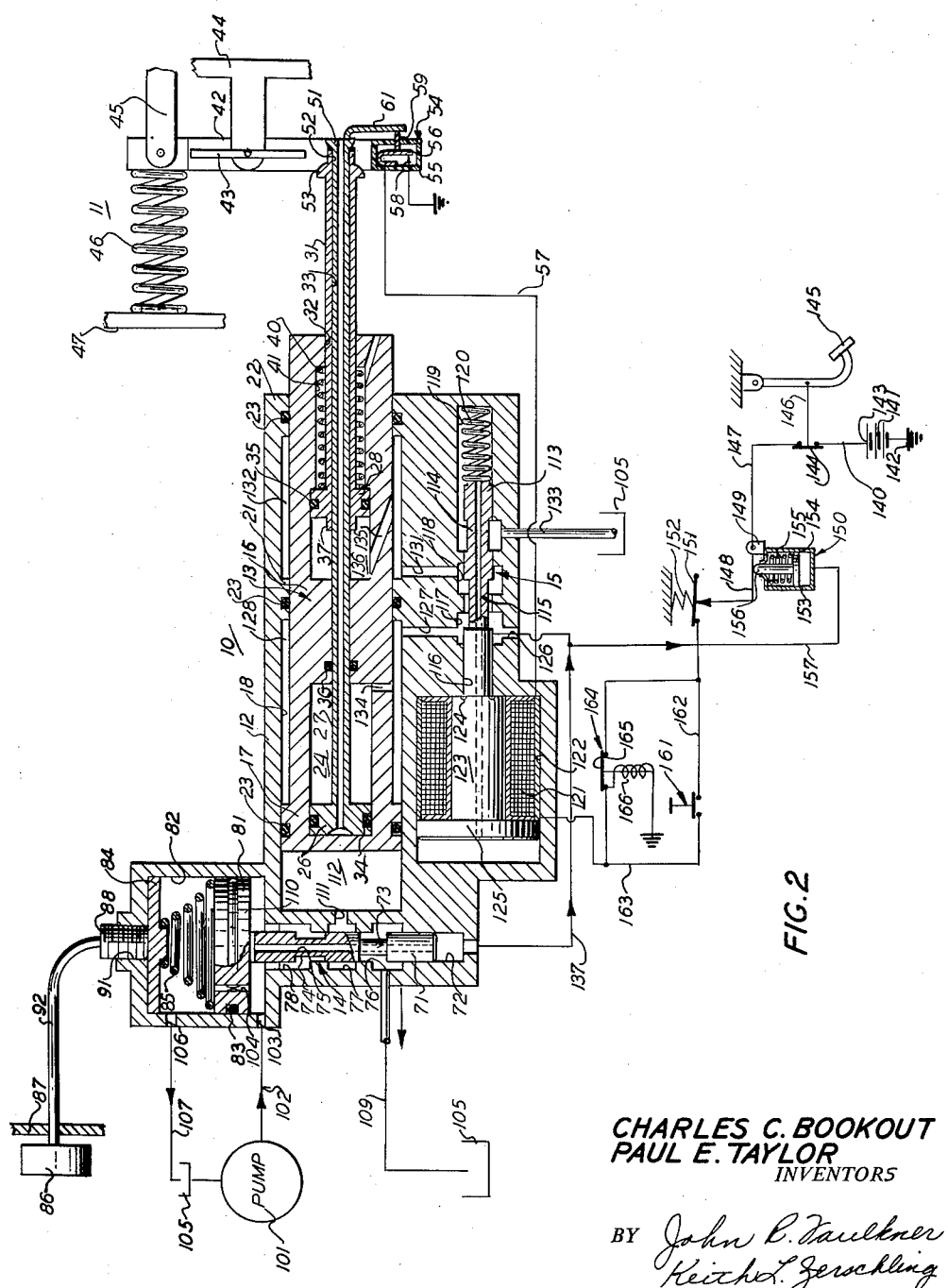
FIG. 2 is a combined sectional and schematic view of the embodiment of the invention shown in FIG. 1 showing the automatic speed control feature of the invention in the energized position.

Referring now to the drawings in which like reference numerals designate like parts throughout the several views thereof, there is shown in FIGS. 1 and 2 one embodiment of the invention including the speed control mechanism of the invention, generally designated by the numeral 10, mounted adjacent to an accelerator linkage mechanism for an automotive vehicle, generally designated by the numeral 11. The speed control mechanism 10 may be mounted in any convenient place where the accelerator linkage 11 is accessible, and preferably is mounted on the carburetor of the motor vehicle. The speed control mechanism 10 includes a housing 12 that supports a linear hydraulic motor 13, a servo valve 14, and a solenoid actuated spool valve 15.

The linear hydraulic motor 13 includes a main piston 16 having an enlarged head end 17. This piston is mounted in a bore 18 in the housing 12 that includes a first portion of reduced diameter 21 and a second portion of reduced diameter 22. The head end 17 of the piston 16 and the reduced portions 21 and 22 of the bore 18 may carry O-ring seals 23. The piston 16 includes a first chamber 24 and a second chamber 25. The first chamber 24 carries a piston 26 having an extension 27, and the chamber 25 carries a piston 28 having an extension 31. The extension 31 of piston 28 extends through a bore 32 in piston 16, while the extension 27 of piston 26 extends through a bore 33 in the piston 28 and its extension 31. The pistons 26 and 28 are provided with O-ring seals 34 and 35, and the piston 16 is provided with an O-ring seal 36 engaging the extension 27. The piston 28 has a boss 37 positioned at the head end thereof so that the head end cannot fully contact the end of chamber 25. Additionally, a spring 40 is positioned in a bore 41 in piston 16 and this spring engages piston 28 to bias the boss 37 into engagement with the end of the chamber 25 remote from the accelerator linkage mechanism 11.

The accelerator linkage mechanism 11 includes a lever 42 that is pivotally mounted together with throttle valve 43 on a portion 44 of a carburetor (not shown). A link 45, partially shown, is adapted to be connected to the accelerator pedal of the automotive vehicle in which the accelerator linkage mechanism is mounted, and a spring 46 is positioned against an abutment 47 and the lever 42 to urge the accelerator linkage to the idle position for the engine.

The extension 27 of piston 26 carries an enlarged end portion 51 that is positioned on one side of the lever 42 to engage the lever 42 when the accelerator pedal is depressed a certain amount, as will be explained in greater detail subsequently. This may be accomplished by providing a bore 52 in the lever 42 through which the extension 27 slidably extends. The extension 31 of piston 28 also includes an enlarged end portion 53 for engaging the side of lever 42 opposite to the side adapted to be engaged by the enlarged end portion 51 of extension 27. An electrical switch 54 is positioned on the end of lever 42 and includes a case 55 preferably constructed of insulating material, a metallic spring 56, and an actuating pin of insulating material 59. The spring 56 is connected to a lead 57, while a ground contact 58 is adapted to be connected to the spring when the pin 59 engages an extension 61 on the enlarged end portion 51 of extension 27, as shown in FIG. 2.

The servo valve 14 includes a spool 71 mounted in a bore 72 positioned in housing 12. The spool 71 includes two portions of reduced diameter 73 and 74, and a central bore 75. The housing 12 includes enlarged annular sections 76, 77 and 78 for cooperation with the spool 71 of the servo valve. Affixed to the upper end of the spool 71 is a piston 81 mounted in a chamber 82 and including an O-ring seal 83. A plate member 84 is positioned at the upper end of the chamber 82, and a nonlinear spring 85 is positioned between the plate member 84 and the piston 81. A speed selector dial 86 may be mounted in any suitable place, for example, on the instrument panel 87 of the motor vehicle. The speed selector dial 86 is connected to a bolt 88, threadingly engaged in bore 91 at the top of the chamber 82, through a flexible cable 92.

An engine driven pump 101 supplies fluid, for example, engine oil under pressure, to the chamber 82 through a conduit 102 and a bore 103 positioned at the lower side of the piston 81. The piston 81 includes a bore 104 having a pressure reducing restriction. This bore and the pressure reducing restriction permits the oil under pressure from the pump 101 to pass through the piston into the portion of the chamber 82 carrying the spring 85. The fluid from this portion of the chamber is returned to a sump 105 through a bore 106 and a conduit 107. A cross bore 110 is positioned between the piston 81 and the spool 71 to permit fluid under pressure to flow down through the bore 75 in the spool 71. A port 111 is provided between the annular enlargement 77 and a chamber 112 formed by the head end 17 of piston 16 and the bore 18.

The solenoid operated spool valve includes a spool 113 having a pair of reduced portions 114 and 115. The spool 113 is mounted in a bore 116 in the housing 12, that has enlarged annular portions 117, 118 and 119.

A solenoid 121 in the form of a cylindrical winding is mounted in a chamber 122 positioned in the housing 12. A shaft 123 extends through the central portion of the solenoid and is affixed to the spool 113 as shown at 124. The shaft 123 includes an enlarged head end 125 that has approximately the same diameter as the chamber 122. The spool 113 and the shaft 123 are urged into the position shown in FIG. 1, by means of a spring 120 positioned in the bore 119 so that the enlarged end portion of shaft 123 engages the end of the chamber 122.

An opening 126 is provided in the housing 12 to communicate with the enlarged annular section 117, and a conduit 127 also communicating with the enlarged annular section 117 connects this section with a chamber 128 defined between the enlarged head end 17 of piston 16 and section 21 of housing 12. Similarly, conduit 131 connects enlarged annular section 118 with chamber 132 defined between sections 21 and 22 of housing 12. A conduit 133 connects the enlarged annular section 119 with the sump 105. The piston 16 includes a conduit 134 connecting chamber 128 with chamber 24, and a conduit 135 connecting the chamber 132 with a chamber 136 defined between the piston 28 and the space between the boss 37 and the outer periphery of the chamber 25. A conduit 137 connects the bore 72 of the servo valve 14 with the opening 126 of the solenoid operated valve 15.

The speed control mechanism of this invention is provided with an electrical circuit for energizing the solenoid 121 to actuate the spool 113 into the position shown in FIG. 2. This circuit includes a source of electrical energy, for example, an automotive storage battery 141 including a grounded negative terminal 142 and a positive terminal 143 connected to a switch 144 by means of a lead 140. The switch 144 is connected to a brake pedal 145 through a pin 146. This switch is normally closed, but it is opened when the brake pedal 145 is depressed a slight amount. The switch 144 is connected to a pressure operated switch 150 through a lead 147. The pressure operated switch includes an arm 148 pivoted at 149, and a second arm 151 biased to its closed position by a spring 152. The pressure operated switch 150 also includes a housing 153 carrying a piston 154 that is normally biased to the lower portion of the housing by a spring 155. The piston 154 carries a pin 156 for engagement with the arm 148. Fluid under pressure is supplied to the housing 153 and the bottom portion of the piston 154 by means of a conduit 157 connected to conduit 137. The arm 151 of pressure switch 150 is connected to a push button switch 161 through a lead 162, and the push button switch in turn is connected to one end of the solenoid 121 through a lead 163. A relay 164, including an armature 165 and a winding 166, is connected between the leads 162 and 163. The other end of the solenoid 121 is connected to the spring 56 of switch 54 through the lead 57.

Figure 3:
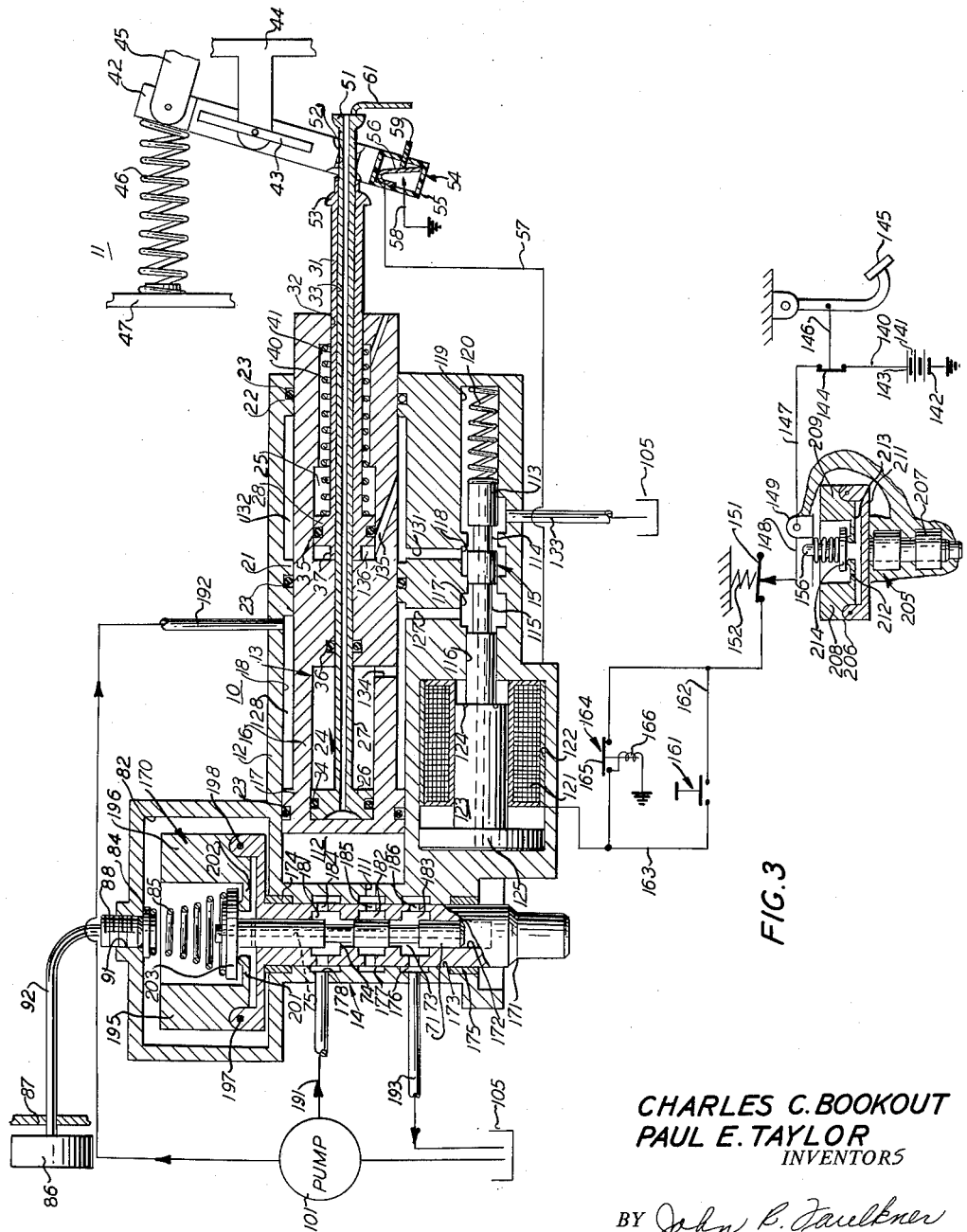
FIG. 3 is a combined sectional and schematic view of another embodiment of the invention showing the automatic speed control feature of the invention in the deenergized position.
Figure 4:
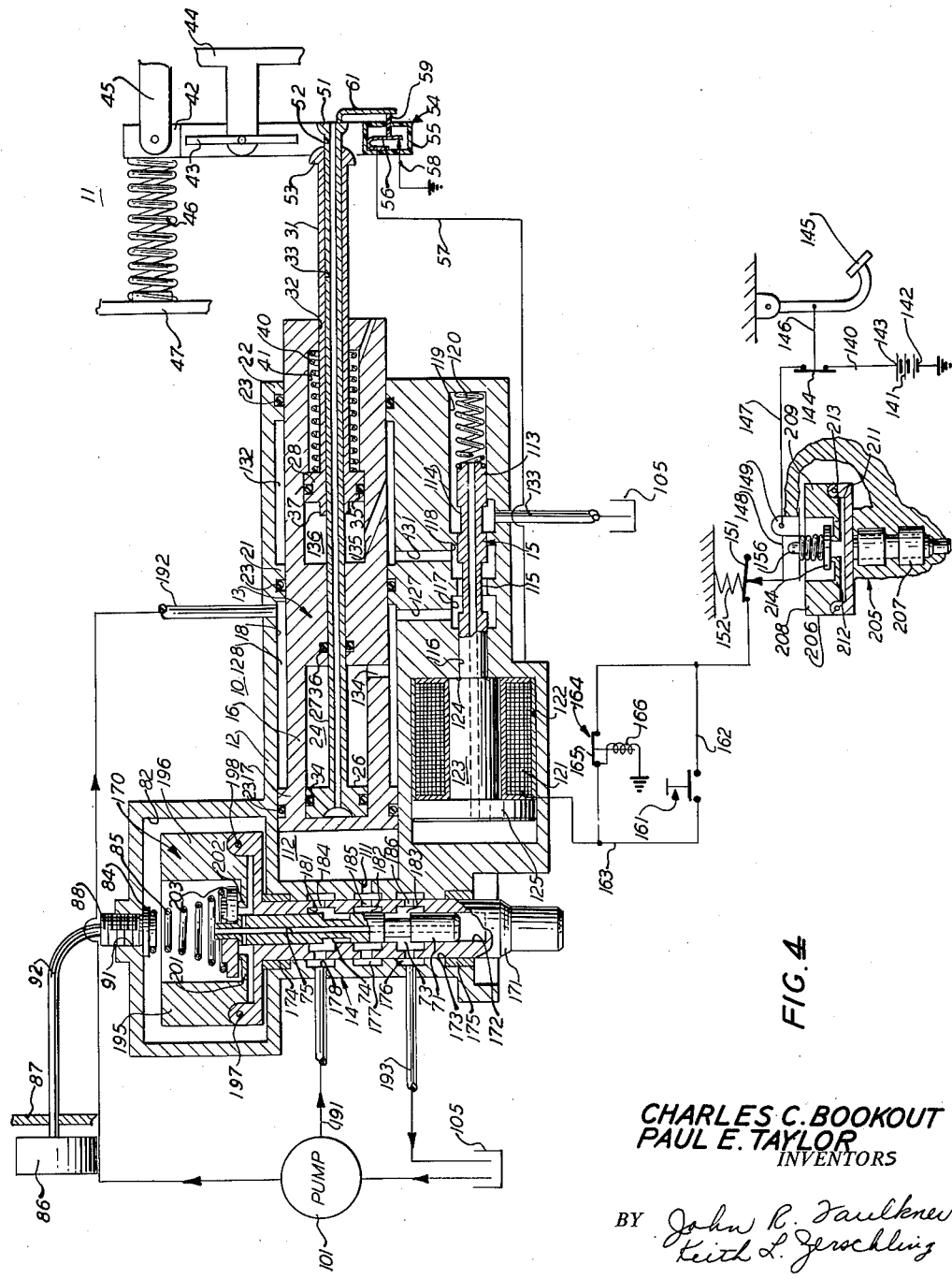
FIG. 4 is a combined sectional and schematic view of the embodiment of the invention shown in FIG. 3 showing the automatic speed control feature of the invention in the energized position.

Another embodiment of the invention is shown in FIGS. 3 and 4. In this embodiment of the invention, the servo valve 14 is controlled by a centrifugal governor mechanism 170 mounted within the chamber 82. This centrifugal governor mechanism includes a sleeve 171 adapted to be connected to a rotating member of the automotive vehicle that rotates at a rate proportional to the speed of the vehicle. This sleeve includes a bore 172 for the reception of the spool 71 of the servo valve, and is rotatably mounted in a bore 173 in the housing 12 by means of a pair of sleeve bearings 174 and 175. The bore 173 includes three enlarged annular sections, designated by the numerals 176, 177 and 178. The bore 172 in the sleeve 171 also includes enlarged annular sections 181, 182 and 183. The enlarged annular sections in the housing are connected to the enlarged annular sections in the sleeve by means of cross conduits 184, 185 and 186. The enlarged annular section 177 in the housing communicates with the port 111 and hence with the chamber 112, including head end 17 of piston 16.

The engine driven pump 101 in this embodiment takes oil from sump 105 and delivers it through a conduit 191 to the enlarged annular section 178 in the housing 12, and to chamber 128 positioned between the piston 16 and the housing 12 by means of conduit 192. The chamber 136 in front of piston 28 receives oil under pressure from chamber 128 when the automatic speed control feature of the invention is brought into operation by energization of the solenoid 121. When the solenoid 121 is energized, the spool 113 of solenoid actuated valve 15 is moved into the position shown in FIG. 4 and the chamber 128 is placed in communication with the chamber 136 via conduit 127, enlarged annular section 117, the space between portion 115 of spool 113 and bore 116, enlarged annular section 118, conduit 131, chamber 132, and conduit 135. The sump 105 may receive oil through conduit 193 from the enlarged annular section 176 in the housing member 12.

The centrifugal governor mechanism 170 is of conventional construction, and includes a pair of arms 195 and 196 pivotally mounted on the sleeve 171 at 197 and 198. The arms 195 and 196 include inwardly extending extensions 201 and 202 that engage a plate member 203 that is affixed to the valve spool 71. The nonlinear spring 85 engages this plate member 203. Thus, the position of the valve spool 71 is controlled by the speed of the sleeve 171 through the position of the arms 195 and 196, and by means of the speed control dial 86 that determines the pressure supplied on the plate 203 by the nonlinear spring 85.

This embodiment of the invention also includes a centrifugally actuated switch 205 in place of the pressure actuated switch 150 shown in FIGS. 1 and 2. This switch is similar to the pressure operated switch 150 with the exception that the pin 156 is actuated by a centrifugal governor mechanism 206 rather than by pressure from the pump 101. This centrifugal governor mechanism includes a shaft 207 adapted to be connected to a rotating member of the automotive vehicle that rotates at a rate proportional to the speed of the vehicle, and also includes a pair of arms 208 and 209 pivotally affixed to platform 211. The arms 208 and 209 include inwardly extending extensions 212 and 213 that engage plate 214 supporting the pin 156. Thus, the position of the pin 156 is controlled by the speed of rotation of the shaft 207.

In all other respects, the embodiment shown in FIGS. 3 and 4 is the same as the embodiment shown in FIGS. 1 and 2. In both embodiments of the invention, the piston 26 including extension 27, and the spool 113 of solenoid actuated spool valve 15, are provided with central bores so that fluid which may leak past the seals for these two devices will not prevent their proper operation.

In the operation of the embodiment of the invention shown in FIGS. 1 and 2, the motor vehicle operator selects the speed at which he wishes to travel by turning the speed selector dial 86 to a desired speed setting. This setting of the speed selector dial moves the plate 84 downwardly to place the proper amount of compression on the spring 85. Prior to the time that the automotive vehicle engine is started the piston 81 will be positioned at the bottom of the chamber 82, and the valve spool 71 will be positioned at its lowest position. The pump 101 pumps fluid, such as engine oil, through the conduit 102 into the bottom of the chamber 82 at a pressure proportional to vehicle speed. This fluid under pressure finds its way into the chamber 112 via enlarged annular section 78, the space between the reduced portion 74 of the servo valve spool 71 and the bore 72, the enlarged annular section 77 and the port 111. Fluid under pressure also flows from the portion of the chamber 82 below the piston 81, through cross bore 110, bore 75 in servo valve spool 71, through conduit 137, opening 126, annular section 117, conduit 127, chamber 128, and conduit 134 into chamber 24 thereby moving the piston 26 to the end of chamber 24 remote from the accelerator linkage mechanism, as shown in FIGS. 1 and 2. The pressure of the fluid in the chambers 24 and 128 opposes the pressure of the fluid in the chamber 112.

Fluid under pressure also flows to the top of the piston 81 through the bore 104 containing the pressure reducing restriction, and then through opening 106 and conduit 107 into sump 105. The pressure, therefore, on the top of this piston due to the fluid under pressure is less than that at the bottom, and the piston will rise to a point where the force of the spring 85, plus the force of the fluid under pressure on the top of the piston balances the force exerted by the fluid under pressure on the bottom of the piston. At this point, the servo valve spool 71 is positioned, as shown in FIGS. 1 and 2, and the opening or port 111 is closed so that additional fluid under pressure may not flow into the chamber 112.

As the speed selector dial 86 is turned toward higher speeds more pressure is exerted on the spring 85 by means of plate 84 and it will take fluid under a higher pressure from the pump 101 to raise the spool to the point where the port 111 is closed. Thus, higher speed settings on the speed selector dial 86, position the piston 16 farther to the right as shown in the drawings and closer to the accelerator linkage mechanism. Since the piston 26 is positioned against the left hand edge of the chamber 24, the position of the end 51 on the extension 27 will be determined by the position of the piston 16 within the bore 18. Thus, the enlarged end portion 51 will be positioned in relation to the speed setting set on selector dial 86. When the vehicle operator depresses the accelerator pedal, the lever 42 is rotated counterclockwise against the force of spring 46, and the lever will come into engagement with the enlarged end portion 51 when the vehicle has reached the speed selected on selector dial 86. At this time the operator feels an increased pressure or back pressure on the accelerator pedal, and he may maintain this speed by bringing the accelerator pedal to rest against this pressure. In emergency situations, however, the operator of the vehicle may overpower this back pressure by exerting additional force upon the accelerator pedal. This additional force will rotate the lever 42 counterclockwise an additional amount and will move the extension 27 with its enlarged end portion 51 and the piston 26 toward the right in chamber 24 against the pressure supplied by the fluid under pressure in the chamber 24.

As will be described subsequently in relation to the automatic speed control feature of the invention, if the speed of the vehicle should exceed the setting on the speed selector dial 86, the pressure in chamber 82 on the under side of the piston 81 will increase and thus the piston will move upwardly carrying with it spool 71 and permitting fluid to flow from chamber 112 to the sump 105. This moves the piston 16, piston 26 and the enlarged end 51 on extension 27 leftwardly and hence the back pressure on the accelerator linkage is felt with less depression of the accelerator pedal. The opposite result occurs if the vehicle speed decreases—in this instance the spool 71 lowers to admit more fluid under pressure into the chamber 112 and hence move piston 16, piston 26 and the enlarged end 51 on extension 27 to the right. Thus, the accelerator pedal must be depressed further before the back pressure is felt.

The invention also includes means, as previously described, for automatically controlling the speed of a vehicle should the operator so desire. As noted above, fluid under pressure is supplied to the pressure switch 150 through conduit 157, and when the vehicle reaches a selected speed, for example, 30 miles per hour, the pin 156 will have risen sufficiently, due to the action of this fluid under pressure, to move the arm 148 about its pivot point 149 to the position where it engages arm 151. If the vehicle is proceeding at the speed set on selector dial 86, the extension 61 on enlarged end portion 51 of extension 27 will act to close the switch 54 as shown in FIG. 2. The motor vehicle operator may then energize the solenoid 121 by depressing push button switch 161. This completes a circuit from battery 141, through switch 144, lead 147, arm 148, arm 151, lead 162, push button switch 161, lead 163, solenoid 121, lead 57 and switch 54 to ground. The energization of the solenoid 121 shifts the spool 113 of solenoid operated spool valve to the right against the bias of spring 120 and into the position shown in FIG. 2. The relay 164 provides a locking feature so that the solenoid remains energized after the operator has removed the pressure from the push button switch 161. The winding of the relay 166 is energized when the push button switch 161 is depressed thus closing the relay and bypassing the push button switch.

When the spool 113 is shifted to the right, fluid under pressure is supplied to chamber 136 through conduit 137, opening 126, enlarged annular section 117, the space between the reduced section 115 of the spool 113 and the bore 116, the annular section 118, conduit 131, chamber 132 and conduit 135. This moves piston 28 toward the accelerator linkage mechanism against the bias of spring 40, and hence clamps the lever 42 between the enlarged end portion 51 of extension 27 and the enlarged end portion 53 of extension 31.

If the vehicle commences to reduce speed, for example, as the result of traveling up an incline, the pressure of the fluid supplied by the pump 101 is reduced, and this permits the force exerted by spring 85 to lower the spool 71 of the servo valve 14 and hence permits more fluid to flow into the chamber 112, thereby moving piston 16 to the right and rotating lever 42 counterclockwise. This action supplies more fuel to the engine of the motor vehicle and hence the vehicle increases speed to the point where fluid under pressure supplied by the pump 101 again closes the servo valve.

Conversely, should the vehicle exceed the speed set on the selector dial 86, the pressure of the fluid supplied by pump 101 will increase, thereby moving the servo valve spool 71 upwardly to permit communication of the chamber 112 with the sump 105 through port 111, enlarged annular section 77, the space between the bore 72 and reduced section 73 of spool 71, enlarged annular section 76, and conduit 109. The pressure of the fluid in the chambers 128 and 24 will then move the piston leftwardly and thereby rotate the lever 42 clockwise to reduce the speed of the engine to the point where the reduced pressure supplied by pump 101 to the lower side of piston 81 permits spool 71 of the servo valve to be positioned as it is in FIGS. 1 and 2 so that the chamber 112 is no longer in communication with the sump 105.

The pressure switch 150 may operate to open the circuit to the solenoid valve 121 when a selected speed is reached, for example, 85 miles per hour. At this speed, the pin 156 will have risen against the pressure of spring 152 to the point where arm 151 breaks contact with lead 162. The circuit for energizing the solenoid 121 may likewise be deenergized by touching the pedal 145 of the brake to open switch 144. When the solenoid is deenergized, the spool 113 of the solenoid operated spool valve moves leftwardly under the bias of spring 120 back to the point shown in FIG. 1. This permits communication between the chamber 136 and the sump 105 by means of conduit 135, chamber 132, conduit 131, enlarged annular section 118, the space between the portion 114 of reduced diameter and the bore 116, the annular space 119, and the conduit 133. The piston 28 will, therefore, move leftwardly under the bias of spring 40 into the position shown in FIG. 1. Thus, the automatic speed control feature will be deenergized, but the enlarged end portion 51 of extension 27 is still capable of exerting a back pressure on the accelerator linkage to act as a speed reminder.

The operation of the embodiment of the invention as shown in FIGS. 3 and 4 is substantially identical with the operation of the embodiment shown in FIGS. 1 and 2 except that in this instance the position of the spool 71 of the servo valve 14 is controlled by the centrifugal governor mechanism 170, and the operation of the arms 148 and 151 are controlled by the centrifugal governor mechanism 206. Also, the chambers 24 and 128 are supplied with fluid under pressure from the pump 101 through a conduit 192, rather than through conduit 137.

In this embodiment of the invention, with the automatic speed control feature energized so that solenoid operated spool valve 15 is positioned as it is in FIG. 4, if the vehicle speed falls below that set on the selector dial 86, the arms 195 and 196 will move inwardly thereby lowering the servo valve spool 71 relative to the sleeve 171. This permits additional oil under pressure to be supplied to the chamber 112 from the pump 101 via conduit 191, annular section 178, cross conduit 184, annular section 181, the space between the reduced portion 74 of spool 71 and the bore 172 in the sleeve 171, annular section 182, cross bore 185, annular section 177, and port 111. This moves the piston 16 to the right thereby moving the lever 42 counterclockwise and increasing the speed of the motor vehicle to the point where the spool 71 of the servo valve is raised to cut off the communication between the pump 101 and the chamber 112 as shown in FIGS. 3 and 4. Conversely, if the speed of the vehicle is increased beyond that set on the speed selector dial 86, the arms 195 and 196 of the centrifugal weight mechanism move outwardly thereby raising the spool 71 to the point where the chamber 112 is in communication with the sump 105, through the port 111, enlarged annular section 177, cross bore 185, enlarged annular section 182, and the space between the section of reduced diameter 73 of spool 71 and bore 172, enlarged annular section 183, cross bore 186, annular section 176 and conduit 193. This permits the piston 16 to move to the left due to the pressure of the fluid in chambers 24 and 128. The lever 42, therefore, is rotated clockwise thereby decreasing the amount of fuel supplied to the engine of the motor vehicle and reducing the speed of the vehicle to the point where the arms 195 and 196 reach a position to lower the spool 71 to the point where communication is cut off between the chamber 112 and the sump 105.

The centrifugally actuated switch 205 is set to move the arm 148 into contact with the arm 151 when the vehicle has reached a selected speed, for example, 30 miles per hour. At this point the arms 208 and 209 will have moved outwardly far enough to raise the pin 156 and the arm 148 into engagement with arm 151 to permit the solenoid 121 to be energized by depression of push button switch 161. When the speed of the vehicle reaches a higher selected speed, for example, 85 miles per hour, the arms 208 and 209 move outwardly further and raise the pin 156 and the arm 148 against the pressure of spring 152 to the point where arm 151 opens the circuit to the solenoid 121.

Thus, the present invention provides a speed control mechanism for an automotive vehicle in which the mechanism may act as a speed reminder for the operator of the motor vehicle and may act as an automatic speed controller to maintain the vehicle at a selected speed over all reasonable terrain.

It will be understood that the invention is not to be limited to the exact construction shown and described, but that various changes and modifications may be made without departing from the spirit and scope of the invention, as defined in the appended claims.

We claim:
1. A speed control mechanism for an automotive vehicle including an accelerator linkage mechanism comprising a hydraulic motor including a movable piston, means for supplying a fluid having a pressure proportional to vehicle speed, a servo valve, said hydraulic motor including said movable piston being connected to said means for supplying a fluid having a pressure proportional to vehicle speed through said servo valve, means connected to said servo valve for controlling fluid flow between said hydraulic motor and said means for supplying a fluid having a pressure proportional to vehicle speed in accordance with a selected speed and the speed of said vehicle, said movable piston having means for engaging one side of said accelerator linkage mechanism when the vehicle reaches the selected speed, fluid actuated means coupled with said movable piston, a valve, said fluid actuated means being connected to said means for supplying a fluid having a pressure proportional to vehicle speed through said valve, and means operable to actuate said valve when the vehicle is traveling at the selected speed for moving said fluid actuated means into engagement with the other side of said accelerator linkage mechanism whereby said accelerator linkage mechanism is clamped between said fluid actuated means and said means for engaging said accelerator linkage mechanism.

2. A speed control mechanism for an automotive vehicle including an accelerator linkage mechanism comprising a hydraulic motor including a movable piston, means for supplying a fluid having a pressure proportional to vehicle speed, a servo valve, said hydraulic motor including said movable piston being connected to said means for supplying a fluid having a pressure proportional to vehicle speed through said servo valve, means connected to said servo valve for controlling fluid flow between said hydraulic motor and said means for supplying a fluid having a pressure proportional to vehicle speed in accordance with a selected speed and the speed of said vehicle, said movable piston having means for engaging one side of said accelerator linkage mechanism only when the vehicle reaches the selected speed, fluid actuated means coupled with said movable piston, a valve, a solenoid for actuating said valve, said fluid actuated means being connected to said means for supplying a fluid having a pressure proportional to vehicle speed through said valve when said solenoid is energized for moving said fluid actuated means into engagement with the other side of said accelerator linkage mechanism, and electrical circuit means for energizing said solenoid, said electrical circuit means including a first switch carried by said accelerator linkage mechanism, said switch forming part of an electrical path to said solenoid, said means for engaging said accelerator linkage mechanism when the vehicle reaches a selected speed including means for closing said first switch when said selected speed is reached, said electrical circuit means also including a second switch adapted to be actuated by the operator of the motor vehicle.

3. A speed control mechanism for an automotive vehicle including an accelerator linkage mechanism comprising a hydraulic motor including a movable piston, means for supplying a fluid having a pressure proportional to vehicle speed, a servo valve, said hydraulic motor including said movable piston being connected to said means for supplying a fluid having a pressure proportional to vehicle speed through said servo valve, means connected to said servo valve for controlling fluid flow between said hydraulic motor and said means for supplying a fluid having a pressure proportional to vehicle speed in accordance with a selected speed and the speed of said vehicle, said movable piston having means for engaging said accelerator linkage mechanism when the vehicle reaches the selected speed, fluid actuated means coupled with said movable piston, a valve, a solenoid for actuating said valve, said fluid actuated means being connected to said means for supplying a fluid having a pressure proportional to vehicle speed through said valve when said solenoid is energized and electrical circuit means for energizing said solenoid, said electrical circuit means including a first switch carried by said accelerator linkage mechanism, said means for engaging said accelerator linkage mechanism when the vehicle reaches a selected speed including means for closing said first switch when said selected speed is reached, a second switch adapted to be actuated by the operator of the motor vehicle, means driven by a mechanism of said automotive vehicle for generating a signal proportional to vehicle speed, and a speed responsive switch connected to said means to receive said signal proportional to vehicle speed, said speed responsive switch being connected in circuit with said first switch and said solenoid and constructed and arranged to close when the speed of the vehicle reaches a selected speed level and to open when the vehicle reaches another and higher selected speed level.

4. The speed control mechanism of claim 3 in which said speed responsive switch is a pressure operated switch and in which said means for generating a signal proportional to vehicle speed is said means for supplying a fluid having a pressure proportional to vehicle speed.

5. The speed control mechanism of claim 4 in which said speed responsive switch includes a centrifugal governor mechanism and in which said means for generating a signal proportional to vehicle speed is a rotating part of the motor vehicle that has a speed of rotation proportional to vehicle speed.

6. In a speed control mechanism for a motor vehicle including an accelerator linkage mechanism, the combination comprising, a linear hydraulic motor including a piston, means for supplying fluid under pressure to said linear hydraulic motor in response to motor vehicle speed and to a selected speed, said means and said linear hydraulic motor being constructed and arranged so that the position of said piston is determined by said selected speed and the speed of the motor vehicle, said piston including a chamber, a second piston positioned in said chamber, said second piston having an extension, means for supplying fluid under pressure to the face of said second piston adjacent said accelerator linkage mechanism, means positioned on the extension of said second piston for engaging said accelerator linkage mechanism and exerting a back pressure thereon when said accelerator linkage mechanism is positioned to propel said motor vehicle at said selected speed, said back pressure being capable of being overpowered by exertion of force on said accelerator linkage so that said second piston moves in said chamber against the pressure of said fluid whereby said motor vehicle may be propelled faster than said selected speed.

7. In a speed control mechanism for a motor vehicle including an accelerator linkage mechanism, the combination comprising, a linear hydraulic motor including a main piston, means for supplying fluid under pressure to said linear hydraulic motor in response to motor vehicle speed and to a selected speed, said means and said linear hydraulic motor being constructed and arranged so that the position of said main piston is determined by said selected speed and the speed of the motor vehicle, said piston including a first chamber, a second piston positioned in said chamber, and second piston having an extension, means for supplying fluid under pressure to the face of said second piston adjacent said accelerator linkage mechanism, means positioned on the extension of said second piston for engaging said accelerator linkage mechanism and exerting a back pressure thereon when said accelerator linkage mechanism is positioned to propel said motor vehicle at said selected speed, said back pressure being capable of being overpowered by exertion of force on said accelerator linkage so that said second piston moves in said chamber against the pressure of said fluid whereby said motor vehicle may be propelled faster than said selected speed, said main piston including a second chamber, a third piston positioned in said second chamber and having an extension, spring means engaging said third piston for urging the extension positioned thereon away from said accelerator linkage mechanism, and means adapted to be actuated by the operator of said motor vehicle for connecting said source of fluid under pressure with said third piston for moving the extension on said third piston into engagement with said accelerator linkage mechanism.

8. In an automatic speed control mechanism for a motor vehicle including an accelerator linkage mechanism, the combination comprising, a housing, a first piston positioned in said housing, said piston having a pair of chambers, a second piston positioned in one of said chambers and a third piston positioned in the other of said chambers, said pistons being coaxially arranged with said second piston having an extension positioned adjacent one side of said accelerator linkage and with said third piston having an extension positioned adjacent the other side of said accelerator linkage, a source of fluid under pressure, a valve positioned to supply fluid under pressure to said first piston from said source, means responsive to the speed of the automotive vehicle and to a selected speed of the automotive vehicle and to a selected speed for controlling said valve and the position of said first piston in said housing, said second piston having fluid under pressure applied to the face thereof adjacent said accelerator linkage, a solenoid operated spool valve, electrical circuit means capable of being actuated when the speed of said vehicle reaches said selected speed for energizing said solenoid and actuating said spool valve, means connecting said source of fluid under pressure to the face of said third piston remote from said accelerator linkage when said solenoid operated spool valve is actuated to move said extension on said third piston into engagement with said accelerator linkage whereby said accelerator linkage is clamped between the extensions of said second and third pistons.

9. The automatic speed control mechanism of claim 8 in which said means responsive to the speed of the automotive vehicle and to a selected speed for controlling said valve and the position of said first piston in said housing includes a centrifugal governor mechanism connecting to an element of said automotive vehicle having a speed proportional to the speed of the vehicle.

10. The automatic speed control mechanism of claim 8 in which said source of fluid under pressure includes means for imparting to the fluid a pressure proportional to vehicle speed, and in which said means responsive to the speed of said automotive vehicle and to a selected speed for controlling said valve and the position of said first piston in said housing includes a chamber, a piston positioned in said chamber and connected to said valve, said chamber being connected to said source of fluid under pressure, said piston being constructed and arranged to be positioned in said chamber in accordance with the pressure of the fluid from said source.

11. A speed control mechanism for an automotive vehicle including an accelerator linkage mechanism comprising, a hydraulic motor including a movable piston, a source of fluid under pressure including means for imparting a pressure to the fluid proportional to vehicle speed, a valve, said hydraulic motor including said movable piston being connected to said source of fluid under pressure through said valve, means connected to said valve for controlling fluid flow between said source of fluid under pressure and said hydraulic motor in accordance with a selected speed and the speed of said vehicle, said last mentioned means including a chamber, a piston positioned in said chamber mechanically coupled to said valve, said piston having a pressure reducing bore positioned therein, means connecting said chamber and the side of said piston connected to said valve with the outlet of said source of fluid under pressure, a spring positioned in said chamber in engagement with the other side of said piston, and means connecting said chamber and the other side of said piston with the inlet of said source of fluid under pressure.

References Cited in the file of this patent

UNITED STATES PATENTS

| | | |
|---|---|---|
| 1,055,741 | Halbleib | Mar. 11, 1913 |
| 2,369,397 | Kostenick | Feb. 13, 1945 |
| 2,527,353 | Christian | Oct. 24, 1950 |
| 2,714,880 | Riley | Aug. 9, 1955 |
| 2,916,100 | Teetor | Dec. 8, 1959 |
| 2,925,066 | Thorner | Feb. 16, 1960 |
| 2,972,391 | Faiver et al. | Feb. 21, 1961 |